Oct. 27, 1936. C. J. YOUNG Re. 20,152

PICTURE RECEIVING APPARATUS

Original Filed March 27, 1929

Inventor
Charles J. Young.
by Charles E. Tullar
His Attorney.

Reissued Oct. 27, 1936 Re. 20,152

UNITED STATES PATENT OFFICE 20,152

PICTURE RECEIVING APPARATUS

Charles J. Young, Haverford, Pa., assignor to General Electric Company, a corporation of New York Original No. 1,848,862, dated March 8, 1932, Serial No. 350,374, March 27, 1929. Application for reissue February 24, 1934, Serial No. 712,855

10 Claims. (Cl. 178—5)

My invention relates to the reception of pictures or messages, and has for its principal object the provision of an improved apparatus and method of operation whereby the received picture or message is directly recorded without distortion and becomes available for use without subsequent processing as soon as it is produced.

Various types of picture receiving and recording apparatus have been provided in the past. Many of these apparatus are not altogether satisfactory for the reason that they are complicated in structure, tend to distort the picture, do not permit the received picture to be used for sometime after it is recorded, and are incapable of continuous operation. In accordance with my invention, these difficulties are avoided by the provision of a facsimile recorder which has its moving parts compactly grouped about a movable scanning member and so arranged that the operation of the apparatus is continuous and the picture is readily removed from the apparatus and becomes available for use immediately after its production.

My invention will be better understood from the following description when considered in connection with the accompanying drawing and its scope will be pointed out in the appended claims.

Figure 1:
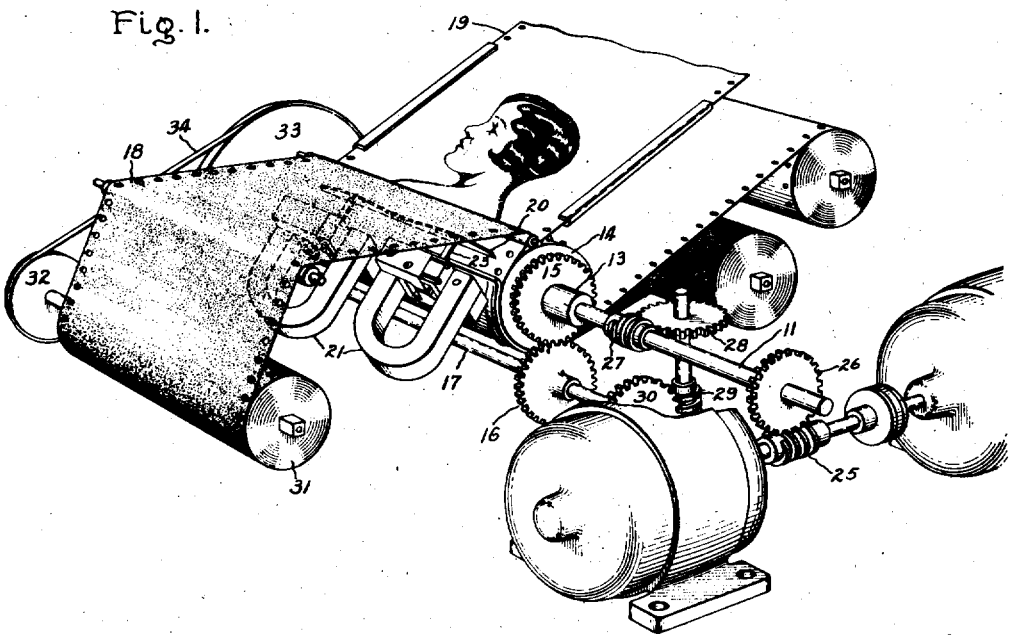
Figure 2:
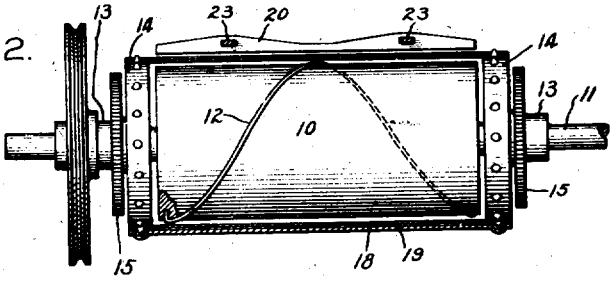
Figure 3:
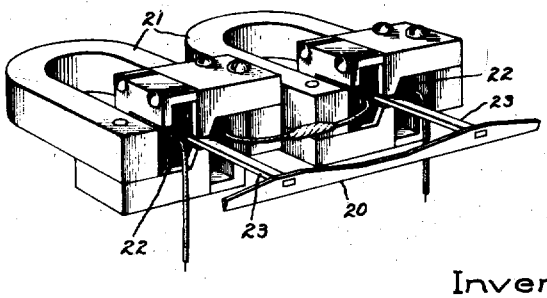

Referring to the drawing, Fig. 1 illustrates a picture receiving and recording apparatus wherein my invention has been embodied; and Figs. 2 and 3 illustrate various details of the apparatus.

The apparatus includes a cylinder 10 which is fixed to a rotatable shaft 11 and is provided with a spiral ridge 12 which may be formed by a small steel wire stretched in a spiral groove formed on the periphery of the cylinder 10 in any suitable manner.

Mounted at the opposite ends of the cylinder 10 and arranged to rotate freely about the shaft 11 are a pair of bearings 13 to each of which is fixed a sprocket wheel 14 and a gear 15. The gears 15 are arranged to cooperate with gears 16 which are fixed to a shaft 17. With this arrangement, the cylinder 10 is rotated at the same speed as the shaft 11 and the sprocket wheels 14 are driven at a speed which is determined by the speed of the shaft 17 and the relation between the gears 15 and 16.

The sprocket wheels 14 are provided for the purpose of moving a carbon backed sheet 18 and a picture receiving sheet 19 through the space between the cylinder 10 and a printing bar 20. The bar 20 is arranged to have its position with respect to the cylinder 10 and ridge 12 controlled by electroresponsive means shown as a pair of motors each including a permanent magnet 21, an actuating coil 22 and a movable armature 23.

The power for driving the drum 10 is applied through a worm 25 and a gear 26. The power for driving the sprocket wheels 14 is applied through worm 25, gear 26, worm 27, gear 28, worm 29, and gears 30, 16 and 15. By this arrangement, the drum 10 is rotated at a comparatively high speed while the sprocket wheels 14 are rotated at a much lower speed. After the carbon backed sheet 18 passes through the space between the printing bar 20 and the ridge 12 of the drum 10, it is rolled on the take-up roll 31 which is mechanically coupled to the shaft 11 through the pulleys 32 and 33 and the belt 34. Belt 34 is arranged to slip on pulley 32 to allow for variation in diameter of roll 31.

For each revolution of the scanning drum 10, one scanning line of the picture is produced. The rotational speed of the drum in revolutions per second is therefore determined by the desired number of scanning lines per second. The sprocket wheels 14 are geared down so that the carbon backed sheet 18 and the picture receiving sheet 19 are driven at a much slower speed. In the operation of the recording apparatus illustrated by the drawing, the movement of the sheets 18 and 19 at the rate of about one inch per minute has been found satisfactory when the drum is rotated at 120 revolutions per minute. Other speeds may of course be utilized.

During the operation of the picture recording apparatus, the series connected coils 22 are supplied with an electrical current which being controlled by the received signal varies in accordance with change in the shading of the successive elemental areas of the transmitted picture. When this current is sufficiently strong, the printing bar 20 or signal actuated member is depressed, thus pinching the sheets 18 and 19 between it and the spiral ridge 12 and producing a black dot on the white sheet 19.

If the printing bar 20 were held in contact with the spiral ridge 12 during one complete revolution of the drum 10, a solid black line extending across the white sheet 19 would be produced. The actual number of dots produced in each line is therefore determined by the number of times the printing bar 20 is brought into contact with the carbon backed paper 18 during each revolution of the scanning drum 10. As will be apparent to those skilled in the art, any suitable means may be utilized for producing synchronism between the moving parts of the apparatus by which the picture is transmitted and the moving parts of the receiving and recording apparatus. It should be understood that by the term carbon backed or bearing sheet which I have used in the description and claims I refer to any sheet which when pressed against the picture receiving paper will leave a mark on the latter.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of scanning means including a rotatable spiral member and a cooperating printing bar arranged to be moved radially with respect to said member, and means arranged to support and move carbon bearing and picture receiving sheets between said members independently of said bar.

2. The combination of a drum mounted on a rotatable shaft and provided with a spiral ridge, a printing bar arranged to be moved in accordance with the shade of the transmitted picture, and means rotatable about said shaft independently of said drum for moving a picture receiving sheet between said ridge and said bar.

3. A continuous picture recording apparatus comprising a rotatable member having a spiral ridge thereon, a cooperating printing bar, and a rotatable member coaxial with said first mentioned member adapted to support a picture receiving sheet and a carbon bearing sheet between the printing bar and the spiral ridge.

4. A continuous picture recording apparatus comprising a rotatable member having a spiral ridge thereon, a printing bar arranged to cooperate therewith, and a rotatable member coaxial with said first mentioned member adapted to support and move a picture receiving sheet and a carbon bearing sheet and means for rotating said members at a constant ratio.

5. A continuous picture recording apparatus comprising a rotatable member having a spiral ridge thereon, a cooperating printing bar, actuating means therefor responsive to the received signal, and means for movably supporting continuous sheets of picture receiving and carbon bearing paper between the spiral ridge and the printing bar and independently of the printing bar.

6. Picture recording apparatus having scanning means including a rotatable spiral member and a cooperating movable signal actuated member, and separate means for moving picture receiving and carbon bearing sheets between said members and in continuous engagement with said rotatable member.

7. Picture recording apparatus comprising a rotatable cylinder having a spiral ridge thereon, a printing bar extending longitudinally of said cylinder, an electromagnet responsive to a received signal for moving the bar toward the cylinder, a sprocket at each end of the cylinder adapted to engage carbon bearing and picture receiving paper and to move the same between the bar and the ridge, a driving motor and means for rotating the cylinder and the sprockets therefrom respectively at different speeds.

8. The combination of scanning means including a rotatable spiral member and a cooperating printing bar, a pair of independent spaced actuating members for said bar to balance the same against torsional twist and separate simultaneously operating means for moving the actuating members and the bar arranged to be moved substantially normal with respect to said member, and means arranged to support and move a recording surface upon which signals are visibly recorded between said members independently of said bar.

9. The combination of a drum mounted upon a rotatable shaft and provided with a spiral ridge, a printing bar, a pair of independent spaced actuating members for said bar to balance the same against torsional twist and separate simultaneously operating means for moving the actuating members and the bar arranged to be moved in and out substantially normal to the ridge and in accordance with the shade of the transmitted subject, and means operating independently of said drum for moving a recording surface between said ridge and said bar at a speed different from the peripheral speed of said drum.

10. The combination of a drum mounted on a rotatable shaft and provided with a spiral ridge, a printing bar, a pair of independent spaced actuating members for said bar to balance the same against torsional twist and separate simultaneously operating means for moving the actuating members and the bar arranged to be moved substantially normal to the ridge in accordance with the shade of the transmitted subject, and means for drawing a reproducing surface between the drum and bar at a rate substantially less than the peripheral speed of rotation of the drum.

CHARLES J. YOUNG.